United States Patent
Kotani et al.

(10) Patent No.: US 6,699,609 B2
(45) Date of Patent: Mar. 2, 2004

(54) FUEL CELL SYSTEM

(75) Inventors: Yasunori Kotani, Saitama (JP); Hikaru Okada, Saitama (JP); Nobutaka Nakajima, Saitama (JP); Seiji Tonegawa, Saitama (JP); Minoru Uoshima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 70 days.

(21) Appl. No.: 09/975,005

(22) Filed: Oct. 12, 2001

(65) Prior Publication Data

US 2002/0045077 A1 Apr. 18, 2002

(30) Foreign Application Priority Data

Oct. 13, 2000 (JP) .......................................... 2000-313244

(51) Int. Cl.⁷ .............................. H01M 8/18; H01M 8/04
(52) U.S. Cl. .............................. 429/19; 429/24; 429/23; 429/26
(58) Field of Search .............................. 429/17, 19, 23, 429/24, 20, 21, 26

(56) References Cited

U.S. PATENT DOCUMENTS 6,322,917 B1 * 11/2001 Acker .......................... 429/17

FOREIGN PATENT DOCUMENTS

JP 11-1302 * 1/1999 .............. B01J/7/00

* cited by examiner

Primary Examiner—Patrick Ryan
Assistant Examiner—R Alejandro
(74) Attorney, Agent, or Firm—Arent Fox Kintner Plotkin & Kahn, PLLC (57) ABSTRACT

A fuel cell system includes a fuel cell in which a first reactant gas and a second reactant gas are supplied to generate electricity. An evaporator evaporates a raw fuel, which combustor exhaust gas discharged from the fuel cell and uses the exhaust gas to evaporate and volatile a raw material for the first reactant gas. A reformer reforms the evaporated and volatilized raw fuel vapor of the raw material by a reforming catalyst to produce the first reactant gas. An air-introducing device introduces the air that is used to be reformed into the evaporator or the reformed in a manner wherein the flow rate of the air is controlled depending upon the output from the fuel cell and upon the temperature of the raw fuel vapor.

10 Claims, 8 Drawing Sheets

FIG. 1

FIG. 3A
Map for Amount of Reforming Air

FIG. 3B
Map for Amount of Air for Removing CO

FIG. 3C
Map for Temperature Correction Factor

FIG. 3D
Map for Upper Limit of Amount of Reforming Air

FIG.5

Map for Output Correction Factor

Map for Amount of Reforming Air

FIG.8

Temperature of Reforming Catalyst

FIG.9

Relation between Temperature of Raw Fuel Gas and Amount of Reforming Air in Case of Keeping Temperature of Reforming Catalyst at Constant Temperature of Raw Fuel Gas (° C)

FUEL CELL SYSTEM

FIELD OF THE INVENTION

The present invention relates to a fuel cell, which supplies fuel gas obtained by reforming hydrocarbon based raw fuel has been reformed to a fuel cell to generate electric power.

DESCRIPTION OF RELATED ARTS

In recent years, due to its cleanness and excellent energy efficiency, a fuel cell (proton exchange membrane type fuel cell) has found attracted as a power source for an electric vehicle or such. The fuel cell can be regarded to as one of a power generator which electrochemically generates power upon supplying fuel gas (hydrogen) for first reactant gas and oxidant gas (air) for second reactant gas.

In a fuel cell powered electric vehicle which carries a fuel cell, mileage of one refueling is required to be as long as possible. For this reason, the fuel cell powered electric vehicle has been developed, which possesses a container for raw fuel liquid such as methanol instead of a hydrogen tank, and the hydrocarbon raw fuel liquid is reformed to produce hydrogen-containing fuel gas to generate power.

Figure 6:
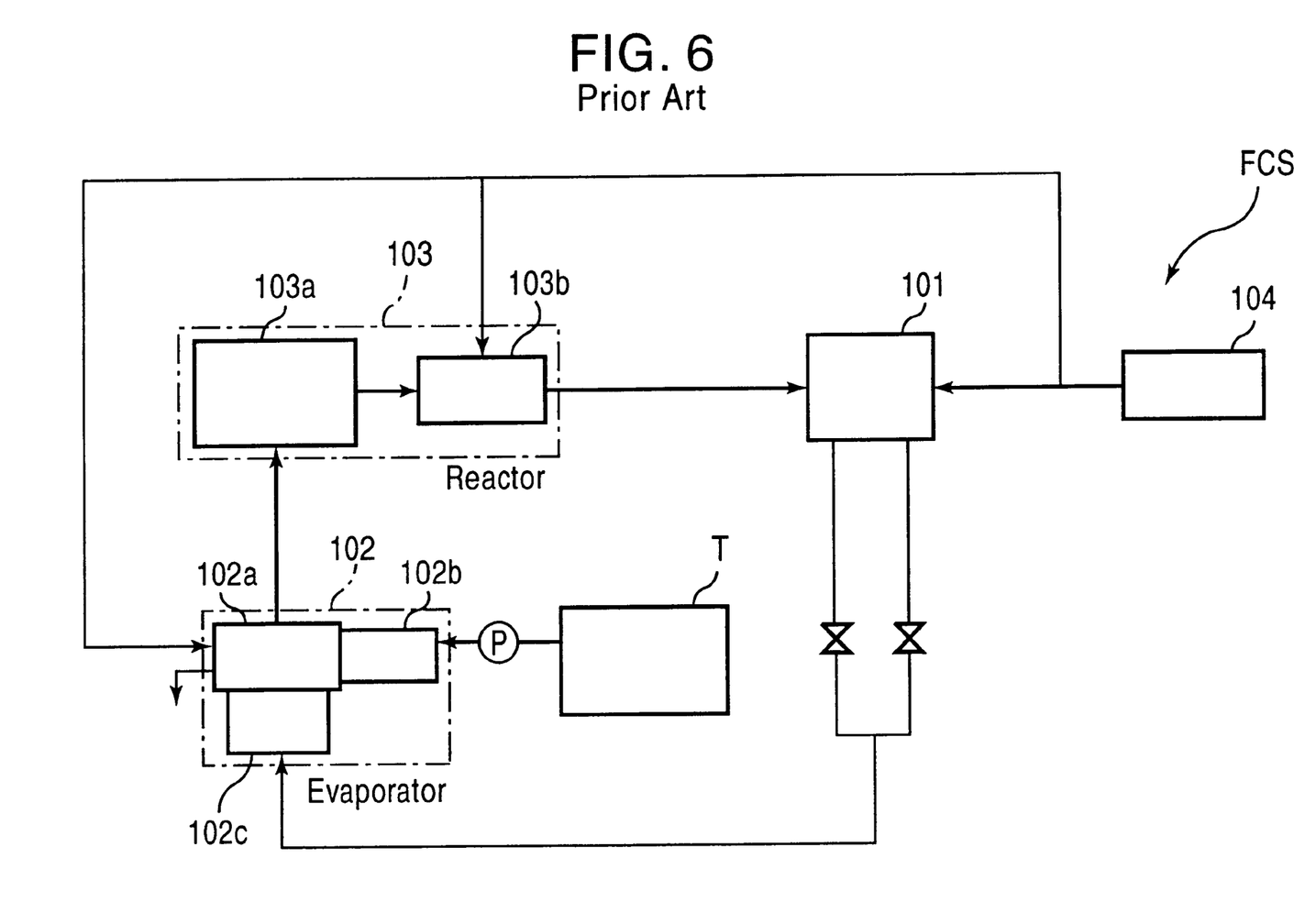
FIG. 6 is a block diagram showing the configuration of the conventional fuel cell system.
Figure 7:
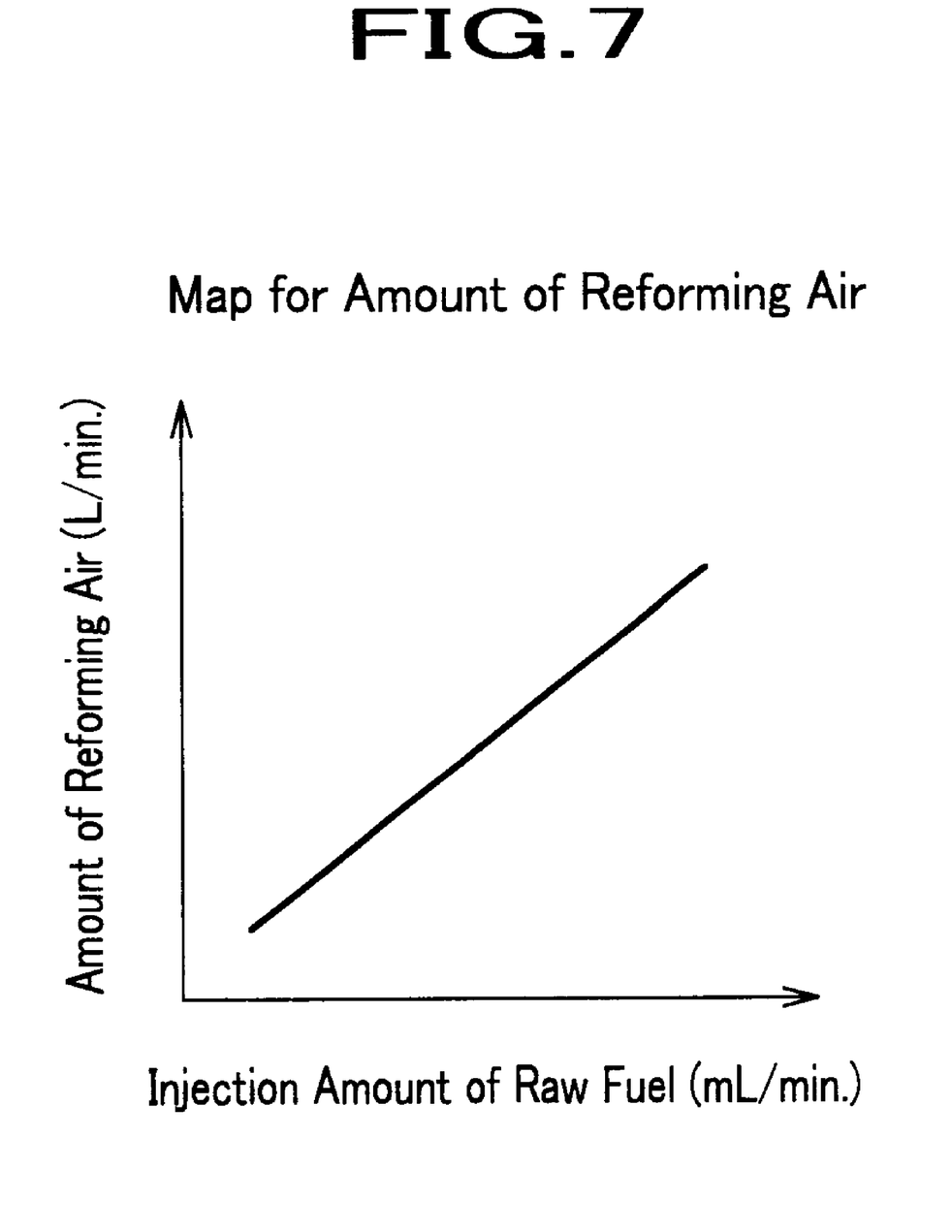
FIG. 7 is a drawing showing a map for the amount of the reforming air, which sets the amount of the reforming air from the injection amount of the raw fuel.

Now referring to FIG. 6, a conventional fuel cell system FCS' possessing a reformer will be described.

A water/methanol mixed liquid (hereinafter referred to as "raw fuel liquid"), which is raw material stored in a storage tank for the raw fuel liquid is pumped to an evaporator 102 by means of a pump P. It is noted that why the raw fuel liquid comprises a mixed liquid of water and methanol is that hydrogen is produced from water and methanol by a steam reforming reaction, which will be described later on. Subsequently, in the evaporator 102, the raw fuel liquid is injected from a raw fuel injecting device 102b to a body 102a of the evaporator, and is evaporated due to the heat generated by the catalytic combustion in a catalyst combustor 102c. Also, reforming air from an air compressor 104 is supplied to the body 102a of the evaporator. Within the body 102a of the evaporator, the vapor of the raw fuel liquid and the vapor are heated and mixed with each other to form raw fuel gas, which is supplied to a reactor 103.

The reactor 103 is composed of a reformer 103a and a CO remover 103b. A catalyst for an automatic thermal reaction (TAR) is incorporated into the reformer 103a, and the reformer 103a reforms the raw fuel gas supplied to the reactor 103 (reformer 103a) to thereby produce hydrogen-containing fuel gas. In the automatic thermal reaction, the following reactions (1) to (4) takes place to produce hydrogen, carbon dioxide, carbon monoxide (small amount), and water.

(1) Steam Reforming Reaction:

$$OH_3OH + H_2O \rightarrow H_2O \rightarrow 3H_2 + CO_2$$

(2) Oxidation $$OH_3OH + 3/2O_2 \rightarrow 2H_2O + CO_2$$

(3) Thermal Decomposition $$OH_3OH \rightarrow 2H_2 + CO$$

(4) Shift Reaction $$CO + H_2O \rightarrow H_2 + CO_2$$

It is noted that the reactions (1) and (3) are endothermic reactions and the reactions (2) and (4) are exothermic reactions.

As a result of these reactions (1) to (4), the fuel gas produced in the reformer 103a contains a small amount (approximately 1%) of carbon monoxide. Supplying fuel gas containing carbon to the proton exchange membrane type fuel cell 101 is not preferable, because a platinum catalyst within the fuel cell 101 is poisoned. Consequently, the fuel cell produced in the reformer 103a is supplied to the CO remover 103b at which CO is converted into $CO_2$ and is removed. Into the CO remover is supplied air for selective oxidation, and by the catalytic function of a catalyst disposed in the CO remover, CO is selectively oxidized. In front of the CO remover 103b, a heat exchanger (not shown) is provided for the purpose of controlling the temperature of the fuel gas within a given level to remove CO in an efficient manner.

In conventional, when the automatic thermal reaction is carried out, the amount of the reforming air to be mixed with the raw fuel gas (the amount of the air to be supplied in the body 102a of the evaporator) is set according to the following procedures (1) to (3):
(1) From the demand output from the fuel cell 101, the demand load from the reformer 103 is set. (2) Based on the demand load, the amount of raw fuel liquid (the injection amount of the raw fuel) to be injected to the body 102a of the evaporator is set. (3) Based on the injection amount of the raw fuel, the amount of reforming air required in the reformer 103a from a map for the amount of the reforming air.

In order to stabilize the reaction in the reformer 103a, the temperature of the evaporator 102 or such is controlled so as to supply the raw fuel gas having a prescribed temperature.

Figure 8:
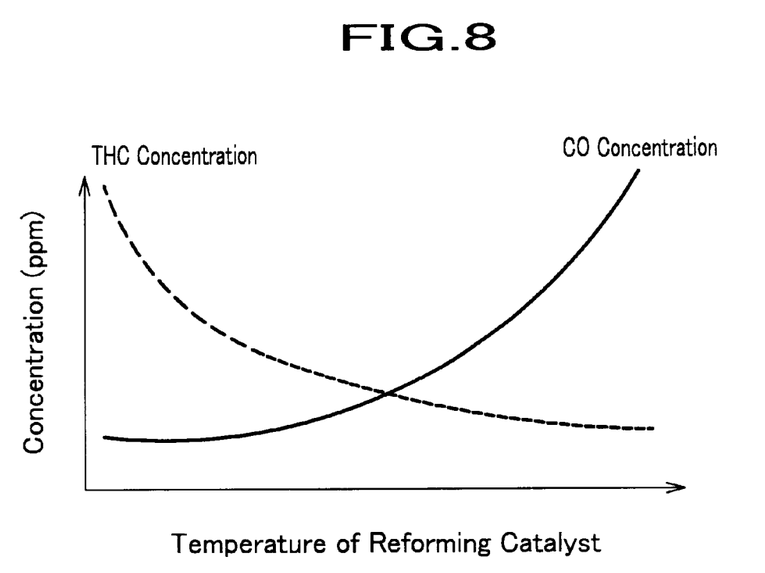
FIG. 8 is a graph showing the relation between the temperature of the reforming catalyst and the concentration of carbon monoxide produced in the fuel gas, and the total hydrocarbon concentration.

However, the temperature of the raw fuel gas varies depending on the variation in the driving conditions of the fuel cell system FCS' and external factors (such as atmospheric temperature). If the temperature of the raw fuel gas is changed, the temperature of the reforming catalyst is also changed accordingly. Specifically, when the temperature of the raw fuel gas to be supplied to the reformer 103a becomes higher, the temperature of the reforming catalyst becomes higher. Conversely, when the temperature of the raw fuel gas becomes lower, the temperature of the reforming catalyst becomes lower. Here, as shown in FIG. 8, if the temperature of the reforming catalyst is increased, the concentration of carbon monoxide (CO concentration) contained in the fuel gas produced is increased. If the CO concentration is too increased, CO is removed in the CO remover 103b only with an insufficient manner, which possibly has an influence upon the platinum catalyst of the fuel cell 101. On the other hand, if the temperature of the reforming catalyst becomes lower, the CO concentration in the fuel gas produced becomes smaller, but the total hydrocarbon (THC) concentration would be increased (in which case, the reforming reaction takes place slowly and unreacted raw fuel is passed as it is, together with the raw fuel gas not sufficiently reformed). For this reason, the amount of the hydrogen produced is decreased, changing the fuel ratio for the worse. If the amount of the hydrogen produced is too decreased, the fuel cell 101 cannot generate power any longer. Particularly, in the case where the fuel cell system FCS' is carried on a vehicle like a fuel cell powered vehicle, the driving conditions and the external factors would be severely changed.

SUMMARY OF THE INVENTION

A main object of the present invention is, therefore, to provide a fuel cell system, which can be operated under appropriate conditions by keeping the temperature of the reforming catalyst at a prescribed level, even if the temperature of raw fuel gas is changed.

Figure 9:
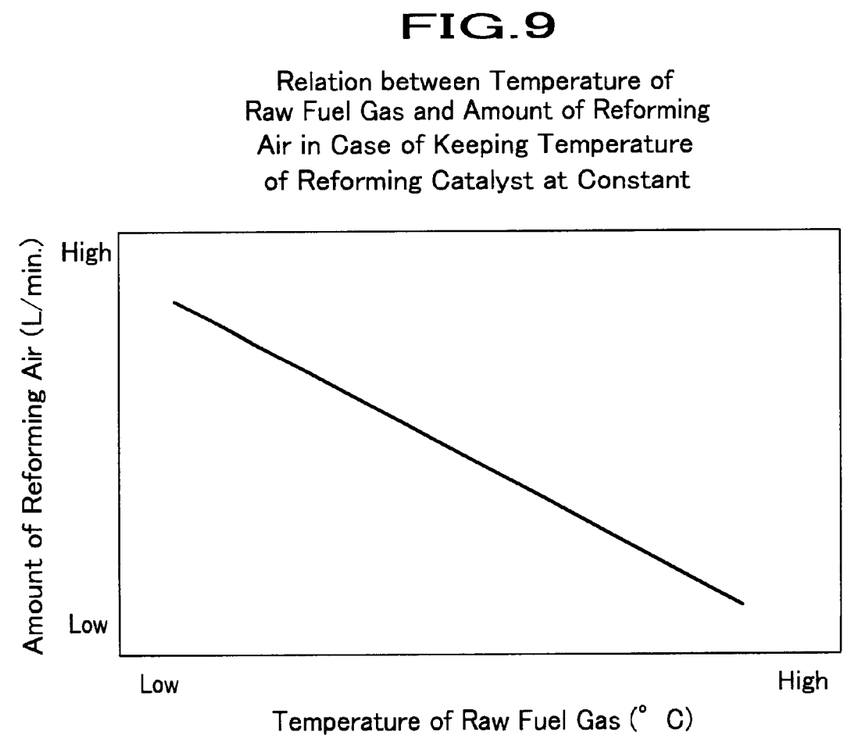
FIG. 9 is a graph showing the relation between the temperature of the raw fuel gas supplied to the reformer and the flow amount of the reforming air, considering that the temperature of the reforming air is kept at constant.

As a result of serious studies in light of the object described above, it has been found that as shown in FIG. 9 showing the relation between the temperature of the raw fuel gas to be supplied to the reformer and the amount of the reforming air in the case of keeping the temperature of the reforming catalyst at constant, if the amount (flow amount) of the reforming air to be supplied to the reformer is controlled even when the temperature of the raw fuel gas is changed, the temperature of the reforming catalyst can be kept at a prescribed level, reaching the present invention.

Specifically, the fuel cell system according to the present invention, which attains these and other objects, comprises:

a fuel cell in which first reactant gas and second reactant gas are supplied to generate electricity, an evaporator for evaporating a raw fuel, which combustor exhaust gas discharged from said fuel cell and makes use of said exhaust gas to evaporate and volatile a raw material for said first reactant gas, a reformer which reforms the evaporated and volatilized raw fuel vapor by means of a reforming catalyst to produce the first reactant gas, and an air-introducing device, which introduces air used to be reformed into said evaporator or said reformed in a manner that the flow rate of the air is controlled depending upon the output from the fuel cell and upon the temperature of the raw fuel vapor.

In the embodiments of the present invention, which will be described later on, the first reactant gas is fuel gas, which is produced in the reformer, and then supplied to the fuel cell, while the second reactant gas is cathode air, which is compressed in the air compressor and supplied to the fuel cell. In the embodiments of the present invention, which will be described later on, the reformer reforms the raw fuel gas comprising vapor (raw fuel vapor) of the raw fuel (methanol+water) admixed with the reforming air in the presence of a reforming catalyst by the automatic thermal reaction to thereby produce fuel gas containing hydrogen. The hydrogen-introducing device in the embodiments of the present invention, which will be described later on, is composed of a control unit, a control valve for controlling the flow amount of the reforming air, and the like. It controls the amount of the air used to be reformed (the amount of reforming air) depending upon the injection amount of the raw fuel and upon the temperature of the fuel gas and supplies the reforming air to the body of the evaporator.

The output from the fuel cell includes both the real output from the fuel cell and the fuel cell-demand output (target output). Furthermore, as used herein, the output from the fuel cell includes the output of the reformer (the real amount of the raw fuel gas produced, the demand of the reactant gas to be produced) and the output of the evaporator for the raw fuel (the real amount of the raw fuel gas evaporated, the demand of the raw fuel gas to be evaporated, the injection amount of the raw fuel liquid, . . . ), and it should not be interpreted to be narrower meanings. Incidentally, in the embodiments of the present invention, which will be described later on, the flow amount of the air used for the reformation (reforming air) is controlled on the basis of the injection amount of the raw fuel liquid (the injection amount of the raw fuel), because the injection amount of the raw fuel and the output from the fuel cell have a close relation (the fuel cell generates power utilizing reformed hydrogen), as the liquid fuel is injected in a large amount when the output from the fuel cell is increased, while the liquid fuel is injected in a small amount when the output from the fuel cell is decreased.

In a preferred aspect of the fuel cell system of the present invention, the air-introducing device carries out the correction based on the deviation between the measured temperature of the raw fuel and the set temperature of the raw fuel to control the flow amount of the air used to be reformed.

According to this configuration, the flow amount of the air used to be reformed is controlled based on the deviation between the measured temperature of the raw fuel and the set temperature of the raw fuel to control the flow amount of the air used to be reformed. In the preferred embodiments described later on, when the measured vapor temperature is enhanced to increase the deviation, the flow amount of the reforming air is decreased to prevent the increasing of the temperature of the catalyst. Conversely, if the measured vapor temperature is decreased to increase the deviation, the flow amount of the reforming air is increased to prevent the decreasing of the temperature of the catalyst. Also, in the embodiments, the measurement of the vapor temperature is carried out using a thermosensor disposed in front of the inlet of the reformer.

In the preferred aspect of the fuel cell system just mentioned, in addition to the correction based on the deviation, the air-introducing device carries out the correction based on the output from the fuel cell to control the flow amount of the air used to be reformed.

For example, when the output from the fuel cell is large, the raw fuel vapor to be supplied to the reformer becomes large accordingly. For this reason, the thermal mass of the raw material vapor also becomes large. In this case, the influences of the thermal mass and the thermal loss (heat loss due to the radiation) upon the reformer become small. Accordingly, in order to decrease the heating-up in the reformer, the flow amount of the air used to be reformed is corrected to be smaller than the usual case. On the other hand, if the output from the fuel cell is small, the raw fuel vapor to be supplied to the reformer becomes small accordingly. For this reason, the thermal mass of the raw material vapor also becomes small. In this case, the influences of the thermal mass and the thermal loss upon the reformer become great. Accordingly, in order to increase the heating-up in the reformer, the flow amount of the air used to be reformed is corrected to be larger than the usual case.

According to another preferred aspect of the fuel cell according to the present invention, the air-introducing device restricts the upper limit of the flow amount of the air used to be reformed based on the output from the fuel cell.

If the flow amount of the air used to be reformed is increased, the exothermic reaction can be accelerated to increase the temperature of the reforming catalyst. However, if the flow amount of the air is too increased, the concentration of the first reactant gas is decreased (i.e., the hydrogen concentration in the fuel gas is decreased), sometimes breaking down the fuel cell. Consequently, with regard to excessively increasing of the amount of the air used to be reformed, for example, when the temperature of the reforming catalyst should be largely increased, it is not preferable to increase the flow amount of the air relative to the output from the fuel cell over a prescribed level. Consequently, the upper limit of the flow amount of the air used to be reformed is restricted based on the output from the fuel cell.

Considering the removal of carbon monoxide, according to still another preferred aspect of the fuel cell of the present invention, the fuel cell system further comprises a CO remover which removes carbon monoxide utilizing the air from the first reactant gas having been reformed in the reformer, and the air-introducing device further introduces the air used for the removal of carbon monoxide into said CO remover in such a manner that the flow amount thereof is controlled based on the output from the fuel cell.

When the air for removing CO is introduced in a controlled flow amount, the performance for removing carbon monoxide to meet the flow amount of the reforming gas can be exhibited.

DESCRIPTION OF THE PREFERRED EMBODIMENTS

The embodiments of the fuel cell system according to the present invention will now be described in detail by referring to the accompanying drawings.

From the difference in how to set the amount of the reforming air to be supplied to the reformer, the embodiments, which are divided into the first and the second embodiments, will be described.
First Embodiment First, the fuel cell system according to the first embodiment will be described. The first embodiment is an embodiment that the amount of the reforming air to be supplied to the reformer is set based on the temperature of the raw fuel gas.

Figure 1:
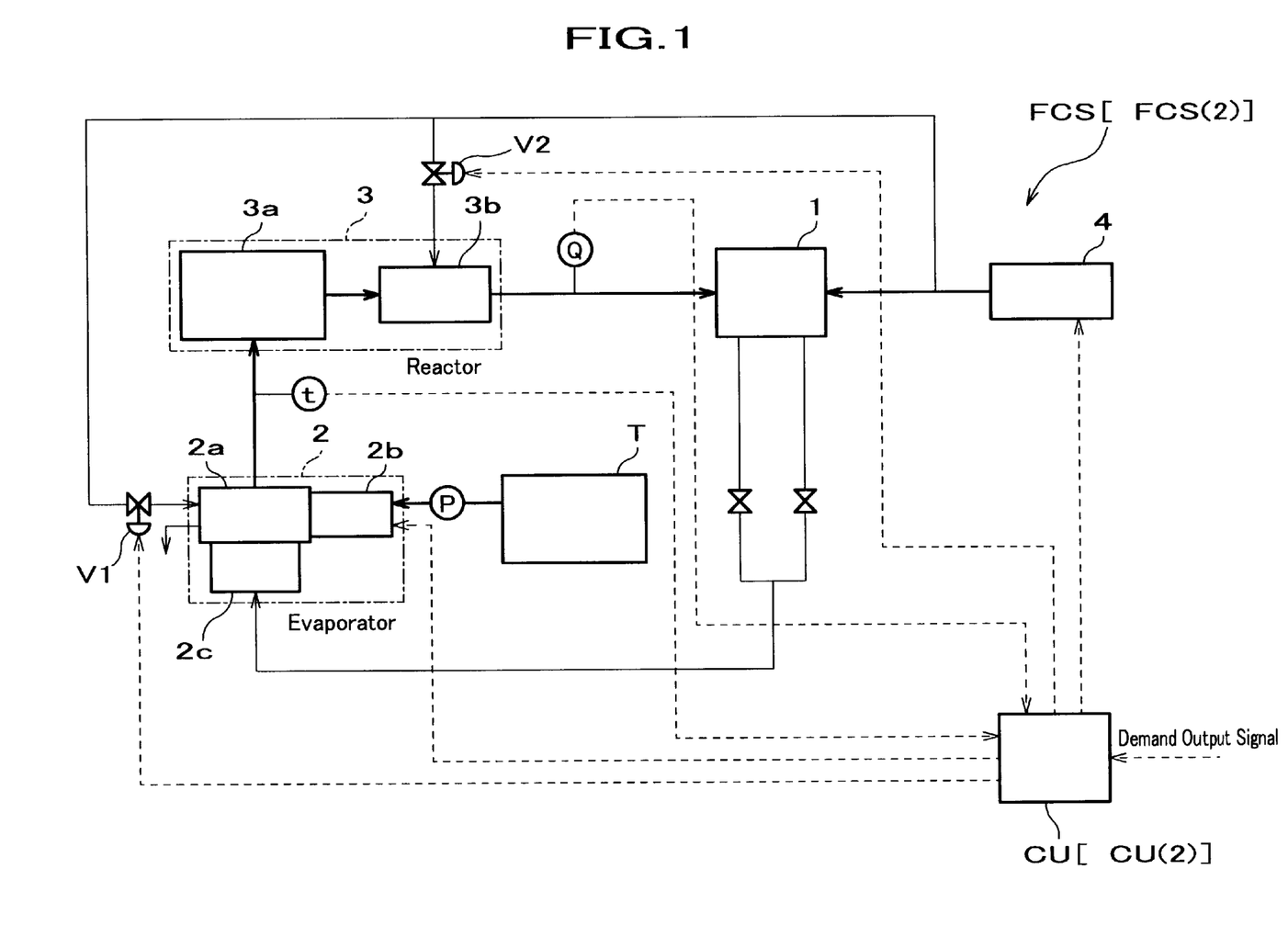
FIG. 1 is a block diagram showing the configuration of the fuel cell system according to the first embodiment of the present invention.

FIG. 1 is a block diagram showing the configuration of the fuel cell system according to the first embodiment of the present invention.

As shown in FIG. 1, the configuration of a fuel cell system FCS includes a fuel cell 1, an evaporator 2, a reactor 3 comprising a reformer 3a and a CO remover 3b, an air compressor 4, a tank T for storing a methanol/water mixed liquid (hereinafter referred to as "tank"), a valve V1 for controlling the flow amount of the reforming air, a valve V2 for controlling the flow amount of the air for removing CO, a thermosensor t, and a control unit CU.

The fuel cell 1 in the first embodiment is a PEM (polymer electrode membrane) type fuel cell and has a laminated construction having approximately 200 single cells laminated. Each single cell comprises a membrane electrode assembly (MEA) comprising an electrode sandwiched between a hydrogen pole and an oxygen pole, and separators between which MEA is sandwiched. When fuel gas containing hydrogen is supplied to the hydrogen pole (anode pole) and air is supplied to the oxygen pole (cathode pole), the hydrogen and oxygen are electrochemically reacted whereby the fuel cell system 1 generates power. Here, PEM is an abbreviation of proton exchange membrane, and MEA is an abbreviation of membrane electrode assembly.

The evaporator 2 heats and evaporates the raw fuel liquid (water/methanol mixed liquid) from the tank T and supplies it to the reformer 3a.

Consequently, the evaporator 2 possesses a body 2a of the evaporator which evaporates the raw fuel liquid, a injecting device 2b for injecting the raw fuel liquid, which injects a prescribed amount of the raw fuel liquid, and a catalytic combustor 2c, which serves as a heat source for the evaporation of the raw fuel liquid. The body 2b of the evaporator has a plurality of thermal tubes (not shown) accommodated therein. It is configured that high temperature gas having been heated by the catalytic combustor 2c flows within each of the thermal tubes to evaporate the injected raw fuel liquid. The injecting device 2b injects the raw fuel liquid pumped from the pump P by means of an injector (not shown). The injector intermittently opens and closes a valve through a PWM signal from the control unit CU. The catalytic combustor 2c is a combustor which catalytically combustor off gas from the fuel cell 1 (the gas comprising a mixture of the gas discharged from the hydrogen pole and containing unused hydrogen and the gas discharged from the oxygen pole and containing unused oxygen).

The body 2a of the evaporator has an air inlet and is configured so that the air supplied from the air compressor 4 is introduced into the body 2a of the evaporator. The air introduced into the body 2a of the evaporator serving as the reforming air is mixed with the raw fuel vapor, and the mixed gas is supplied to the reformer as the raw fuel gas. The amount of the air supplied from the air compressor 4 is controlled by a pressure control valve (not shown) and the control valve V1 for controlling the amount of the reforming air. The control valve V1 for controlling the amount of the reforming air is a gate valve, and the opening of the valve is controlled by a valve opening signal from the control unit CU. The reason why the reforming air is supplied to the body 2a of the evaporator is that the raw fuel vapor and the air are mixed in an appropriate manner to obtain uniform raw fuel gas.

When the calorie supplied to the body 2a of the evaporator is increased or decreased so that the temperature of the raw fuel gas supplied to the reformer 3a becomes approximately 200° C., the temperature of the raw fuel gas can be controlled, but is changed depending upon the load variations (variation in the amount of the raw fuel gas required) and external factors (simple variation in the atmospheric temperature).

The temperature of the raw fuel gas supplied to the reformer 3a (vapor temperature) is measured by a thermosensor such as a thermocouple, and the measured signal is transferred to the control unit CU.

The reformer 3a possesses a honeycomb catalyst layer in a thin plate form having the reforming catalyst for the automatic thermal (ATR) reaction carried therein, and when the raw fuel gas flows into the honeycomb catalyst layer, the fuel gas containing hydrogen is produced according to the following formulae (1) to (4)

(1) Steam Reforming Reaction:

$$OH_3OH+H_2O \rightarrow H_2O \rightarrow 3H_2+CO_2$$

(2) Oxidation $$OH_3OH+3/2O_2 \rightarrow 2H_2O+CO_2$$

(3) Thermal Decomposition $$OH_3OH \rightarrow 2H_2+CO$$

(4) Shift Reaction $$CO+H_2O \rightarrow H_2+CO_2$$

It is noted that the reactions (1) and (3) are endothermic reactions, and upon these reactions taking place, the heat is taken to decrease the temperature of the reforming catalyst. On the other hand, the reaction (2) is an exothermic reaction, and upon these reactions taking place, the heat is generated to increase the temperature of the reforming catalyst. The reaction (4) is an exothermal reaction with generating only a small amount of the heat. Consequently, upon the reaction taking place, the temperature of the reforming catalyst is increased similar to the reaction (3) (but the degree of increasing the temperature of the reforming catalyst is smaller than that in the case of the reaction (3)). As shown in FIG. 8, when the temperature of the reforming catalyst is increased, the total hydrocarbon amount in the fuel gas is decreased, but the carbon monoxide concentration is increased. Conversely, if the temperature of the reforming catalyst is decreased, the total hydrocarbon amount in the fuel gas is increased, but the carbon monoxide concentration is decreased.

It is noted that the temperature of the fuel gas produced in the reformer exceeds 200° C. (typically about 300° C.). In order to make the temperature of the reforming catalyst uniform and to uniformly bring about the reforming reaction, a plurality of the honeycomb catalyst layers are placed within the reformer 3a in parallel (parallel multi-stage honeycomb catalyst layer).

The interior of the CO remover 3b is filled with a catalyst for a selective oxidation reaction, which selectively oxidizes carbon monoxide contained in a concentration of approximately 1% in the fuel gas to be converted into carbon dioxide, removing carbon monoxide (not more than 100 ppm). Oxygen is required for the selective oxidation. For this reason, it is configured that air for the selective oxidation is supplied from the air compressor 4 through a pressure control valve (not shown) and the valve V2 for removing carbon monoxide. The valve V2 for removing carbon monoxide is a gate valve, and is controlled through a signal for opening of the valve from the control unit CU. The valve V2 for removing carbon monoxide may be composed, for example, of an injector or a needle valve, in addition to the gate valve.

In order to prevent the hydrogen consumption due to undesired reactions (reverse shift reaction, methanation reaction) occurring in the CO remover 3b, a heat exchanger (not shown) is disposed between the reformer 3a and the CO remover 3b, and allows the temperature of the fuel gas supplied into the CO remover to cool down to not more than 250° C. (typically approximately 100° C.). The selective oxidation in the CO remover 3b is an exothermic reaction, which raises the temperature of fuel gas to 150° C. or more. On the other hand, the operating temperature of the fuel cell should be not more than 100° C. For this reason, a heat exchanger (not shown) is provided between the CO remover 3b and the fuel cell 1 (anode pole side) to control the temperature of the fuel cell supplied to the fuel cell to be such a temperature that the fuel cell 1 can be operated in a suitable manner (for example, 80° C.).

The flow amount of the fuel gas after flowing through the heat exchanger (not shown) is measured by a flow meter Q, which sends the measured signal to the control unit CU.

The compressor 4 is, for example, a supercharger driven by a motor (not shown), which takes in the air from atmosphere and supplies it to the fuel cell 1 (cathode pole side). When the demand output from the fuel cell 1 is increased, the air compressor 4 increases the rotation number of the motor based on the control signal from the control unit CU so as to supply the air corresponding to the demand output. A humidifier and heat exchanger (both not shown) are provided between the fuel cell 1 and the air compressor 4 so that the air is humidified and the temperature of the air is controlled to supply the air to the fuel cell 1. The humidification of the air is for the prevention of the decreasing of the proton dielectricity which would be caused by drying the electrode membrane of the fuel cell 1.

The control unit CU is composed of CPU, a memory, an input/output interface, and A/D converter, bath, and the like, and controls the amounts of the fuel gas and the cathode air to be supplied to the fuel cell 1 and the amounts of the reforming air and the air for removing carbon monoxide. By controlling the amount of the reforming air, the temperature of the reforming catalyst in the reformer 3a is controlled to be a prescribed temperature corresponding to the variation in the temperature of the raw fuel gas to be supplied in the reformer 3a.

Next, referring to FIGS. 2 and 3, the configuration of the control unit CU will be described.

Figure 2:
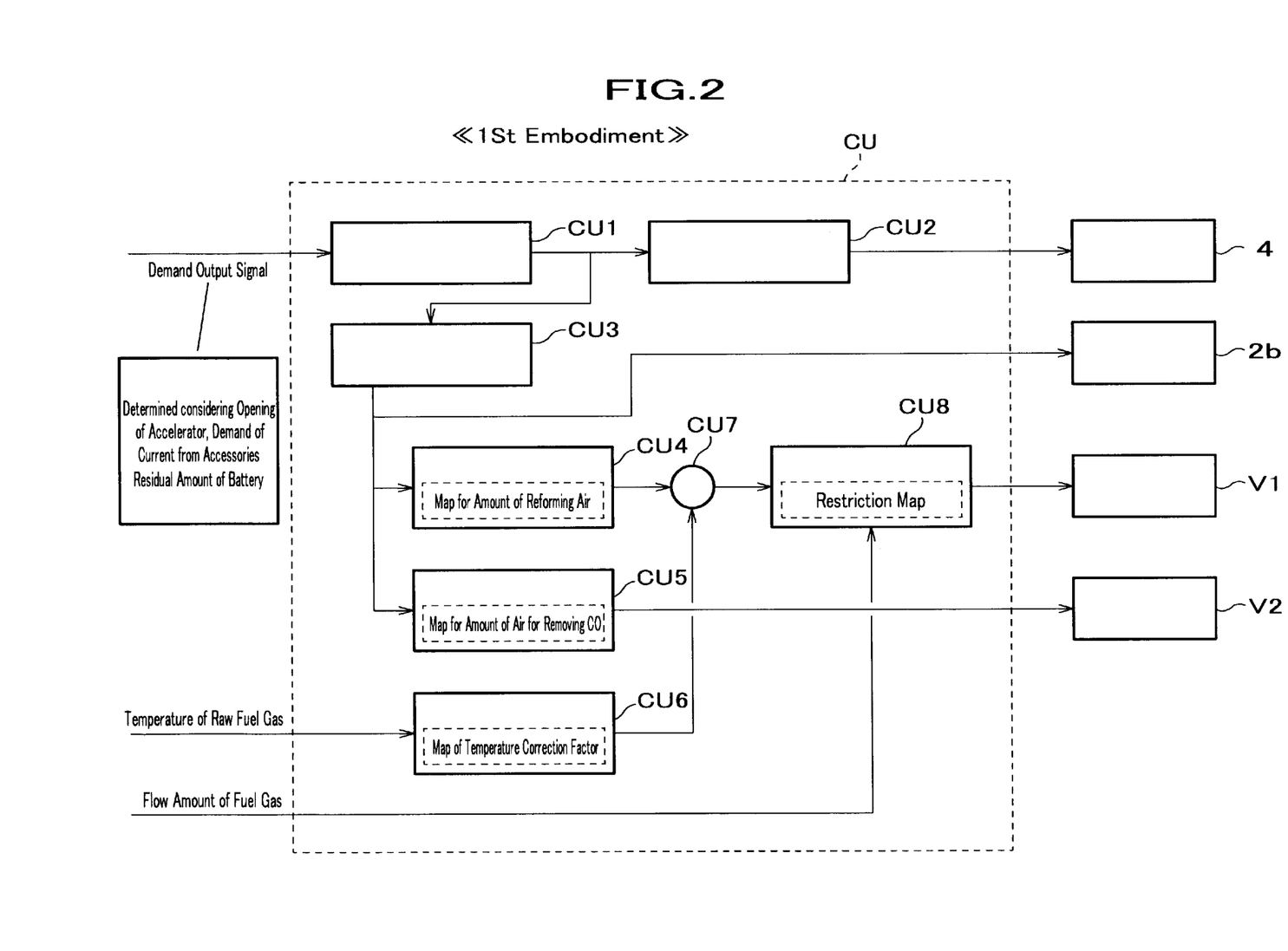
FIG. 2 is a functional block diagram showing the configuration of the control unit in the fuel cell system according to the first embodiment of the present invention.
Figure 3A:
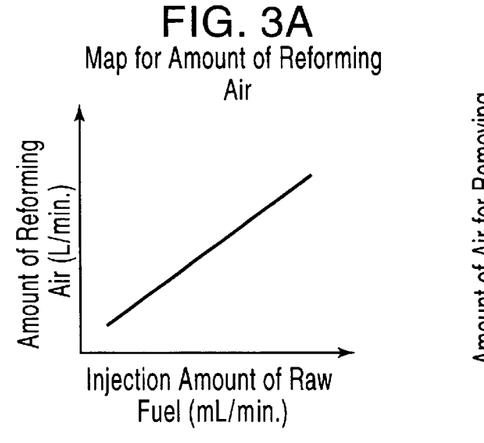
FIG. 3A is a drawing showing a map for the amount of the reforming air which sets the amount of the reforming air from the injection amount of the raw fuel in the control unit in FIG. 2.
Figure 3B:
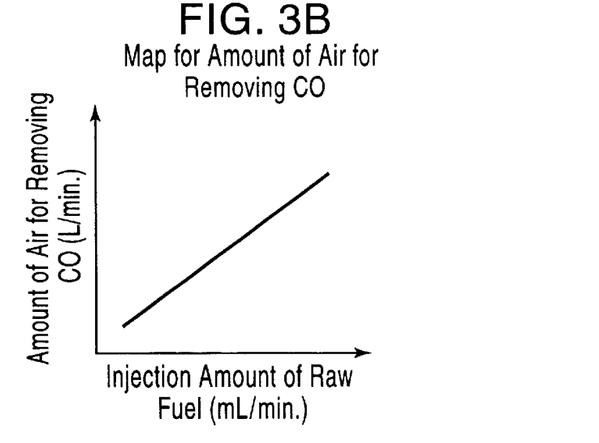
FIG. 3B is a drawing showing a map for the amount of the air for removing CO which sets the amount of the air for removing CO from the injection amount of the raw fuel in the control unit in FIG. 2.
Figure 3C:
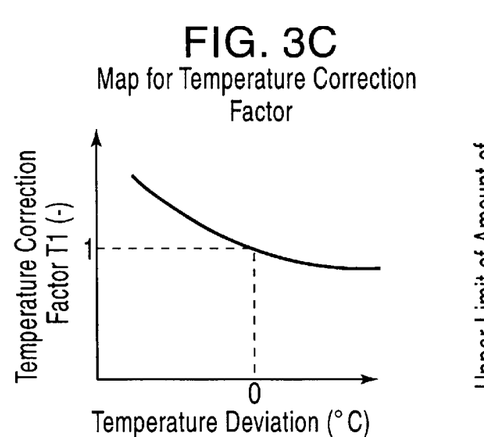
FIG. 3C is a drawing showing a map for the temperature correction factor which sets the temperature correction factor from the temperature deviation in the control unit in FIG. 2.
Figure 3D:
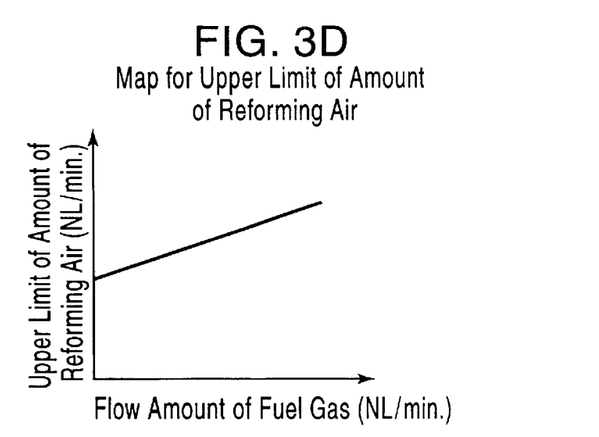
FIG. 3D is a drawing showing a map for the upper limit of the flow amount of the reforming air, which sets the upper limit of the flow amount of the reforming air from the injection amount of the raw fuel in the control unit in FIG. 2.

FIG. 2 is a functional block diagram showing the configuration of the control unit. FIG. 3A is a drawing showing a map for the amount of the reforming air which sets the amount of the reforming air from the injection amount of the raw fuel in the control unit in FIG. 2, FIG. 3B is a drawing showing a map for the amount of the air for removing CO which sets the amount of the air for removing CO from the injection amount of the raw fuel in the control unit in FIG. 2, FIG. 3C is a drawing showing a map for the temperature correction factor which sets the temperature correction factor from the temperature deviation in the control unit in FIG. 2, and FIG. 3D is a drawing showing a map for the upper limit of the flow amount of the reforming air, which sets the upper limit of the flow amount of the reforming air from the injection amount of the raw fuel in the control unit in FIG. 2.

As shown in FIG. 2, the control unit CU is composed of means CU 1 for setting the FC-demand current, means CU2 for setting the amount of the cathode air, means CU3 for setting the injection amount of the raw fuel, means CU4 for setting the amount of the reforming air, means CU5 for setting the amount of the air for removing carbon monoxide, means CU 6 for setting the factor for the temperature correction, means CU7 for multiplication, and means CU7 for comparing and restricting the amount of the reforming air.

The means CU1 for setting the FC-demand current inputs a demand output signal (digital signal) which totally controls the fuel cell system FCS from a main control unit (not shown), and sets and outputs a target power generation amount of the fuel cell 1 (FC-demand current) utilizing a map or such. The FC-demand current is set so that it is increased as the demand output signal is increased. The main control units sets the demand output signal, considering the accelerator opening signal ($\theta$TH) due to the driver's volition, the demand current from the accessories, the residual of the battery, and the like, and output it to the control unit CU (the means CU1 for setting the FC-demand current).

The means CU2 for setting the amount of the cathode air sets the amount of the cathode air from a map or such on the basis of the FC-demand current. The amount of the cathode air is set so as to be larger as the FC-demand current becomes larger. The amount of the cathode air is converted into a revolution number signal of the motor possessed by the air compressor 4, and is output to the air compressor 4. Receiving the signal, the air compressor 4 (motor) is driven to supply an amount of the cathode air to meet the situation to the fuel cell 1. By adding means (not shown), the amount the reforming air and the amount of the air for removing carbon monoxide are added to the amount of the cathode air. Consequently, the air compressor 4 compresses and transfers an amount of the air to meet the amount of the cathode air, the amount of the reforming air and the amount of the air for removing carbon monoxide.

The means CU3 for setting the injection amount of the raw fuel sets the injection amount (target amount) of the raw fuel from a map based on the FC-demand current and outputs it to the injecting device 2b for injecting the raw fuel liquid. The injecting device 2b for injecting the raw fuel liquid injects the amount of the raw fuel liquid based on the injection amount of the raw fuel to the body 2a of the evaporator. The injection amount of raw fuel from the means CU3 for setting the injection amount of the raw fuel is output as a PWM signal for driving an injector (not shown).

The means CU4 for setting the amount of the reforming air sets the amount of the reforming air from a map for the amount of the reforming air shown in FIG. 3A based on the injection amount (target amount) of the raw fuel and outputs it to the means CU7 for multiplication. The map for the amount of the reforming air has been set so that the amount of the reforming air is increased according to an increase in the injection amount of the raw fuel based on the results of various experiments and logical operations.

The means CU5 for setting the amount of the air for removing carbon monoxide sets the amount of the air for removing carbon monoxide from a map for the amount of the air for removing carbon monoxide shown in FIG. 3B based on the injection amount (target amount) of the raw fuel. The means CU5 for setting the amount of the air for removing carbon monoxide further converts the amount of the air for removing carbon monoxide into a valve opening signal and output it to the valve V2 for controlling the flow amount of the air for removing CO. Upon receiving the signal, the opening of the valve V2 for controlling the flow amount of the air for removing CO is changed to be a level to supply an amount of the air for removing CO to the valve V2 for controlling the flow amount of the air for removing CO remover to meet the situation. The map for the amount of the air for removing carbon monoxide is set based on the results of various experiments and logical operations so that the amount of the air for removing carbon monoxide is increased as the injection amount of raw fuel is increased. The reason of such a setting is that the amount of carbon monoxide is produced in an increased amount as the injection amount of the raw fuel is increased.

The means CU6 for setting the factor for the temperature correction inputs the temperature of the raw fuel gas measured by a thermosensor t, converts it into a digitalized signal of the temperature of the raw fuel gas, and calculates a temperature deviation with a set temperature of the raw fuel gas which has previously memorized (set vapor temperature). Based upon the temperature deviation, the means CU6 for setting the factor for the temperature correction sets a temperature correction factor K1 from a map for the temperature correction factor shown in FIG. 3C, and outputs it to the means CU7 for multiplication.

The map for temperature correction factor is set so that the temperature correction factor K1 is decreased as the temperature deviation is increased at the plus side (i.e., the temperature of the raw fuel gas measured by the thermosensor t is increased). As described later on, if the temperature correction factor K1 is decreased, the amount of the reforming air to be supplied to the reformer 3a becomes smaller than the amount of the reforming air set by the map for the amount of the reforming air (see FIG. 3A). Specifically, by correcting the amount of the reforming air to be decreased, the possibility of the oxidation in the reformer 3a is decreased to suppress the amount of heat generation (proportion of the endothermic steam reforming reaction is increased). It is noted that if the amount of the heat generation is suppressed, the temperature of the catalyst is decreased. On the other hand, the map for temperature correction factor is set so that the temperature correction factor K1 is increased as the temperature deviation is increased at the minus side. As described fully later on, if the temperature correction factor K1 is increased, the amount of the reforming air to be supplied to the reformer 3a becomes smaller than the amount of the reforming air set by the map for the amount of the reforming air. Specifically, by correcting the amount of the reforming air to be decreased, the possibility of the oxidation in the reformer 3a is increased to increase the amount of the heat generation (proportion of the endothermic steam reforming reaction is decreased). It is noted that if the heat generation amount is increased, the temperature of the catalyst is increased.

The means CU7 for multiplication carries out the temperature correction by multiplying the amount of the reforming air from the means CU4 for setting the amount of the reforming air by the temperature correction factor K1 from the means CU6 for setting the factor for the temperature correction, and outputs it to later means CU8 for comparing and restricting the amount of the reforming air. This makes the amount of the reforming air to be an appropriate temperature-corrected value.

In the control unit CU according to this embodiment, the means CU8 for comparing and restricting the amount of the reforming air is provided. The means CU8 for comparing and restricting the amount of the reforming air inputs the flow amount of the fuel gas measured by the flow sensor Q and converted into the digitalized data. Also, based on the digitalized flow amount data, the means CU8 for comparing and restricting the amount of the reforming air sets the upper limit of the amount of the reforming air from a map for the upper limit of the amount of the reforming air shown in FIG. 3D. Subsequently, comparing the upper limit of the amount of the reforming air with corrected amount of the reforming air from the upper limit of the amount of the reforming air set by this map and from the means U7 for the multiplication, if the amount of the reforming air exceeds the upper limit, the means CU8 for comparing and restricting the amount of the reforming air set the upper limit of the amount of the reforming air as the amount of the reforming air. On the other hand, if the amount of the reforming air from the means U7 for the multiplication does not exceeds the upper limit, the means U7 sets the amount of the reforming air having been corrected by the means U7 for the multiplication as the amount of the reforming air. The set amount of the reforming air is converted into a valve opening signal, which is output to the valve V1 for controlling the flow amount of the reforming air. It is noted that the map for the upper limit of the amount of the reforming air is set based on various experiments and logical operations so that the amount of the reforming air is increased as the amount of the fuel gas is increased.

The reason why the upper limit of the amount of the reforming air is restricted is that the amount of the water produced is decreased, if the amount of the reforming air is increased to increase the proportion of the oxidation reaction (2) described previously, causing the fear of damaging the fuel cell. In other words, even if the same amount of the raw fuel liquid is injected, the amount of the water produced is decreased if the amount of the reforming air is increased to increase the proportion of the oxidation, causing the fear of damaging the fuel cell.

Consequently, the upper limit of the amount of the reforming air is set based on the flow amount of the fuel gas so that the fuel gas which contains an amount of hydrogen appropriate to satisfy the demand output signal to the fuel gas system FCS can be supplied to the fuel cell 1. Specifically, the map for the amount of the reforming air as shown in FIG. 3A based on the injection amount of the raw fuel (flow amount of the raw fuel gas) is corrected by the map for the upper limit of the amount of the reforming air based on the flow amount of the fuel cell as shown in FIG. 3D so that the fuel gas containing appropriate amount of hydrogen can be supplied to the fuel cell 1.

The opening of the valve V1 for controlling the flow amount of the reforming air becomes a degree to supply an amount of the reforming air corrected and set by the valve opening signal to the CO remover 3b to meet the situation.
Outline of Operation Referring to FIGS. 1 to 3, the outline of the operation of the fuel cell system FCS described previously will be explained.

In the control unit CU, inputting demand output signal determined considering the opening of the accelerator, the demand of the current from the accessories, the residual amount of the battery, and the like, the means CU1 for setting the FC-demand current sets a demand output signal based on the map etc., and outputs to the means CU2 for setting the amount of the cathode air, the means CU3 for setting the injection amount of the raw fuel, and the like.
(Amount of Cathode Air)

Inputting the demand output signal, the means CU2 for setting the amount of the cathode air researches a map (not shown) utilizing the demand output signal as the address to set an amount of the cathode air, which is output to the air compressor 4. Since the amount of the reforming air and the amount of the air for removing carbon monoxide are added to the amount of the cathode air, the air compressor 4 compresses and transfers an amount of air to meet the amount of the cathode air, the amount of the reforming air and the amount of the air for removing carbon monoxide.
Injection Amount of Raw Fuel Inputting the demand output signal, the means CU3 for setting the injection amount of the raw fuel makes a map research (not shown) utilizing the demand output signal as the address to set the injection amount of the raw fuel, which is output to the device 2b for injecting the raw fuel liquid. The device 2b for injecting the raw fuel liquid injects the raw fuel liquid to the body 2a of the evaporator in such an amount corresponding to the injection amount of the raw fuel. The raw fuel liquid injected to the body 2a of the evaporator is evaporated by the heat caused by catalytically combusting the off gas from the fuel cell 1.

The injection amount of the raw fuel is also output to the means CU4 for setting the amount of the reforming air and to the means CU5 for setting the amount of the air for removing carbon monoxide.
Amount of Reforming Air Inputting the demand output signal, the means CU4 for setting the amount of the reforming air researches the map for the amount of the reforming air shown in FIG. 3A utilizing the demand output signal as the address to set the amount of the reforming air, which is output to the means CU7 for multiplication. In order to correct the amount of the reforming air, the temperature correction factor K1 from the means CU6 for setting the factor for the temperature correction is input to the means CU7 for multiplication. The means CU6 for setting the factor for the temperature correction makes a research of the temperature correction factor shown in FIG. 3C utilizing the temperature of the fuel gas as an address to set temperature correction factor K1.

The amount of the reforming air having been temperature-corrected is output to the means CU8 for comparing and restricting the amount of the reforming air.

Upon inputting the amount of the reforming air having been temperature-corrected, the means CU8 for comparing and restricting the amount of the reforming air researches the map of the upper limit of the amount of the reforming air as shown in FIG. 3D using the amount of the reforming air with temperature-corrected to set the upper limit of the amount of the reforming air. The means CU8 for comparing and restricting the amount of the reforming air then compares the amount of the reforming air with temperature-corrected with the upper limit of the amount of the reforming air to set the amount of the reforming air. If the amount of the reforming air with temperature-corrected exceeds the upper limit, the upper limit of the amount of the reforming air is set as the amount of the reforming air.

The reforming air thus determined is converted into a valve opening signal, which is output to the valve V1 for controlling the flow amount of the reforming air. The opening of the valve V1 for controlling the flow amount of the reforming air becomes a level corresponding to supply the set amount of the reforming air to the body 2a of the evaporator.

Whereas the reforming air is supplied to the body 2a of the reforming air as described above, the reforming air is mixed with and heated together with the vapor of the raw fuel liquid, which is supplied to the reformer 3a as a uniform raw fuel gas. The temperature of the raw fuel gas is typically about 200° C.
Reforming In the reformer 3a, from the raw fuel gas comprising methanol, water, and the reforming air, raw fuel gas comprising hydrogen, carbon dioxide, carbon monoxide (small amount) and water (steam) is produced in the presence of the reforming catalyst according to the automatic thermal reaction. It is noted that the progress of the oxidation reaction (2) mentioned above depends upon the amount of the reforming air supplied, and when the amount of the reforming air is relatively larger, the oxidation occurs in a relatively high ratio, while when the amount of the reforming air is relatively small, the oxidation proceeds only with a low ratio.

The temperature of the fuel gas produced in the reformer 3a is controlled in a heat exchanger (not shown), and the fuel gas is then supplied to the CO remover 3b.

(Amount of Air From Which CO is Removed/Removal of CO)

Inputting the injection amount of the raw fuel from the means CU3 for setting the injection amount of the raw fuel, the means CU5 for setting the amount of the air for removing carbon monoxide makes a research for the map of the amount of the air for removing CO as shown in FIG. 3B utilizing the input injection amount to set the amount of the air for removing CO. The set amount of the air for removing CO is then converted into valve opening signal, which is output to the valve V2 for controlling the flow amount of the air for removing CO. From the output signal the valve V2 for controlling the flow amount of the air for removing CO supplies an amount of the air for removing CO to meet the set amount of the air for removing CO.

In the presence of the catalyst, the CO remover 3b selectively oxidizes CO with the use of the air for removing CO to convert carbon monoxide into carbon dioxide, which is removed.

The fuel gas (anode gas) from which carbon monoxide is removed and the cathode air are supplied to the fuel cell, and the power generation is carried out. The off gas exhausted from the fuel cell 1 containing unused hydrogen and unused oxygen is catalytically combusted in the catalytic combustor 2c to generate a calorie which evaporates the raw fuel liquid.

Situation Where Temperature of Raw Fuel Gas is Changed

Referring to FIGS. 1 to 3 and 8, the operation of the fuel cell system FCS will be described in the situation where the temperature of the raw fuel gas to be supplied is changed.

When he temperature of the raw fuel gas is increased due to change in the driving conditions or the external factors, the temperature of the reforming catalyst in the reformer 3a is increased. In this case, the concentration of carbon monoxide is increased as shown in FIG. 8. When the concentration of carbon monoxide is too many increased, the CO remover 3b cannot totally remove carbon monoxide, and the carbon monoxide remaining un-removed would poison the platinum catalyst of the fuel cell 1.

However, according to the first embodiment of the present invention, if the temperature of the raw fuel gas is increased and, thus, the temperature deviation is increased at the plus side, the temperature correction factor K1 set by means CU 6 for setting the factor for the temperature correction is decreased as shown in FIG. 3C. Consequently, in comparison with the case where the temperature deviation factor K1 is zero, the temperature correction is carried out so that the amount of the reforming air is decreased in this case. As a result, the oxidation (2) in the reformer 3a (exothermic reaction) as mentioned previously is suppressed to decrease the temperature of the reforming catalyst. As shown in FIG. 8, since the concentration of carbon monoxide is decreased according to the decreasing of the temperature of the catalyst, the poisoning of the platinum catalyst can be prevented.

On the other hand, when he temperature of the raw fuel gas is decreased due to change in the driving conditions or the external factors, the temperature of the reforming catalyst in the reformer 3a is decreased. In this case, the total hydrocarbon concentration is increased, which would occur the situation where unreacted raw fuel is passed as it is and the raw fuel gas not sufficiently reformed is also passed, changing the fuel ratio for the worse.

However, according to the first embodiment of the present invention, if the temperature of the raw fuel gas is decreased and, thus, the temperature deviation is increased at the minus side, the temperature correction factor K1 set by means CU 6 for setting the factor for the temperature correction is increased as shown in FIG. 3C. Consequently, in comparison with the case where the temperature deviation factor K1 is zero, the temperature correction is carried out so that the amount of the reforming air is increased in this case. As a result, the oxidation (2) in the reformer 3a as mentioned previously is accelerated to increase the temperature of the reforming catalyst. As shown in FIG. 8, since the total hydrocarbon concentration of carbon monoxide is decreased according to the increasing of the temperature of the catalyst, the fuel ratio can be improved and the exhaustion of the hydrocarbon can be prevented.

Specifically, from the map for the temperature correction factor as shown in FIG. 3C, (1) the amount of the reforming air is set so as to decrease the temperature of the reforming catalyst if the temperature of the raw fuel gas becomes more than the set temperature of the raw fuel gas; and (2) the amount of the reforming air is set so as to increase the temperature of the reforming catalyst if the temperature of the raw fuel gas becomes lower than the set temperature of the raw fuel gas. Accordingly, the temperature of the reforming catalyst can be kept at constant even if the temperature of the fuel gas is changed. This makes it possible to stabilize the composition of the fuel gas.

Second Embodiment

Next the fuel cell system according to the second embodiment of the present invention will now be described. The fuel cell system according to the second embodiment is an embodiment where the amount of the reforming air to be supplied to the reformer is set based on the temperature of the raw fuel gas and the injection amount of the raw fuel (i.e., the condition of the injection amount of the raw fuel is added).

It is noted that the configuration of the fuel cell system of the second embodiment is only different from that of the first embodiment in the control unit. Consequently, the same parts and the same elements will are referred to the drawings of the first embodiment, their description will be omitted, and only the control unit which has a different configuration from that of the first embodiment will be described.

Figure 4:
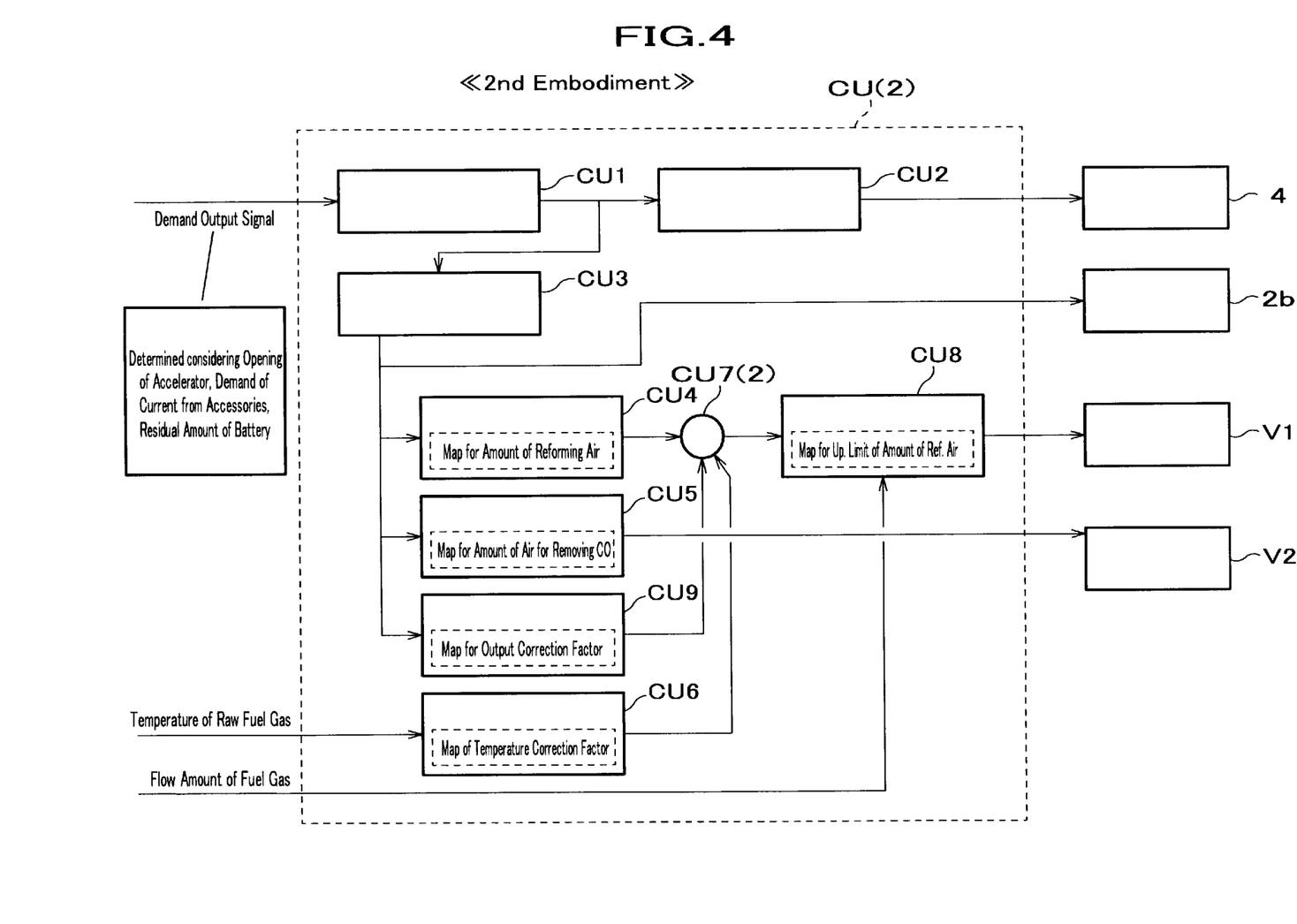
FIG. 4 is a block diagram showing the configuration of the control unit in the fuel cell system according to the second embodiment of the present invention.
Figure 5:
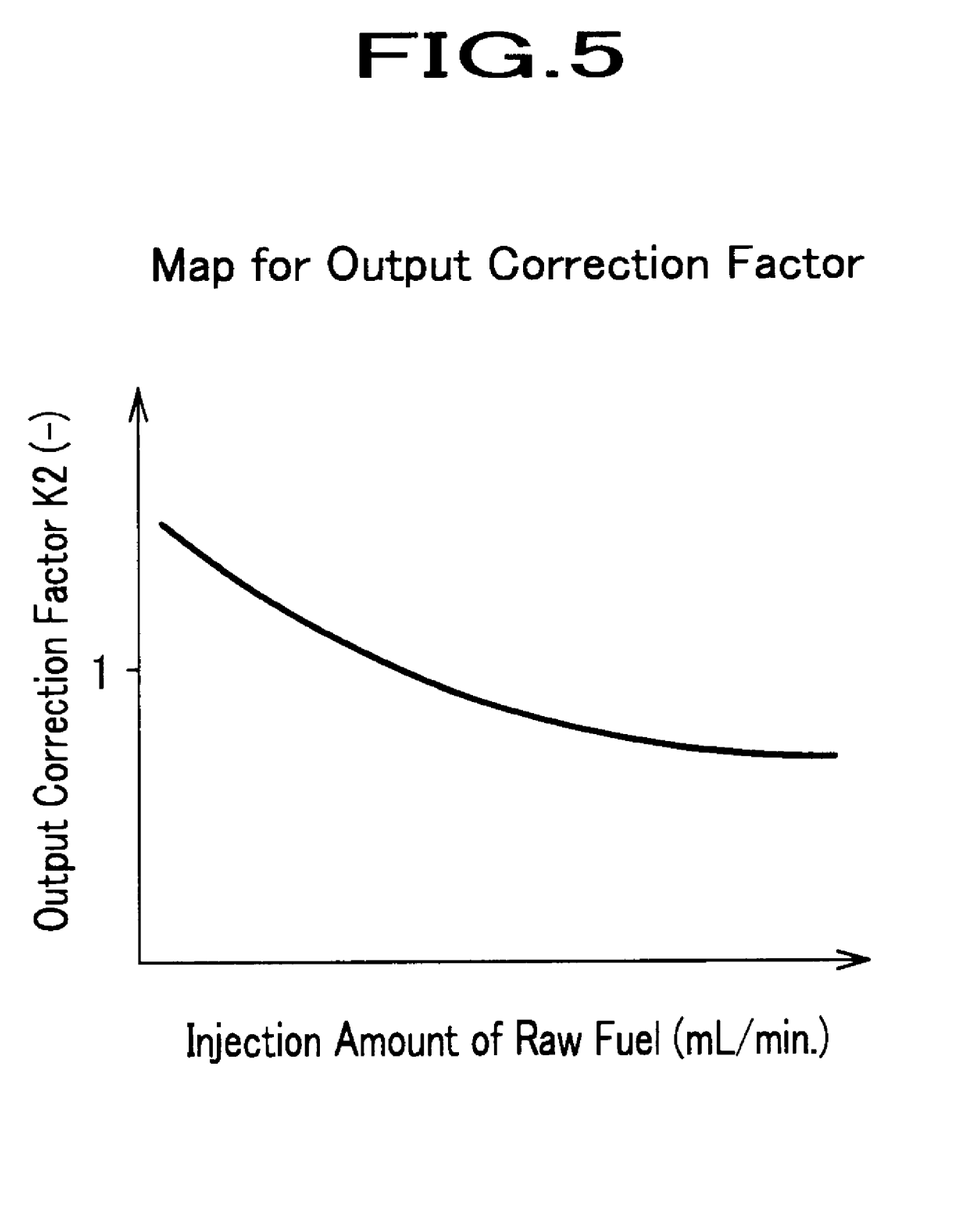
FIG. 5 is a drawing showing a map for the output correction factor which sets the output correction factor from the injection amount of the raw fuel in the control unit in FIG. 4.

FIG. 4 is a block diagram showing the configuration of the control unit in the fuel cell system according to the second embodiment of the present invention, and FIG. 5 is a drawing showing a map for the output correction factor which sets the output correction factor from the injection amount of the raw fuel in the control unit in FIG. 4.

As shown in FIG. 4, the control unit CU (2) has all the configuration of the control unit CU of the first embodiment, and also possesses means CU9 for setting the output correction factor.

The means CU9 for setting the output correction factor sets an output correction factor K2 from a map for the output correction factor shown in FIG. 5 based on the injection amount of raw fuel, and outputs it to the means CU7 (2) for multiplication. The map for the output correction factor is set so that the output correction factor K2 is increased when the injection amount of the raw fuel is increased, and the output correction factor K2 is decreased when the injection amount of the raw fuel is decreased due to the following reasons:

(1) If the injection amount of the raw fuel is small, the flow amount of the raw fuel gas to be supplied to the reformer 3a is small, in which case the thermal mass of the reformer 3a and heat leakage from the reformer 3a (loss of heat radiation) would have great influence upon the temperature of the reforming catalyst (because the thermal mass possessed by the fuel gas only has a small influence). For this reason, in order to keep the temperature of the reforming catalyst at constant, the amount of the reforming air should be increased.

(2) If the injection amount of the raw fuel is large, the flow amount of the raw fuel gas to be supplied to the reformer 3a is large, in which case, the thermal mass of the reformer 3a and heat leakage from the reformer 3a have little influence upon the temperature of the reforming catalyst (because the thermal mass possessed by the fuel gas only has a great influence). For this reason, in order to keep the temperature of the reforming catalyst at constant, the amount of the reforming air should be decreased.

The means CU7 (2) for multiplication multiplies the amount of the reforming air from the means CU4 for setting the amount of the reforming air with the temperature correct factor K1 from the means CU 6 for setting the factor for the temperature correction, and further with the output correction factor K2 to correct the amount of the reforming air. The upper limit of the amount of the reforming air thus temperature-corrected and output-corrected is restricted by the means CU8 for comparing and restricting the amount of the reforming air.

In addition to the operation of the fuel cell system according to the first embodiment of the present invention, the fuel cell system FCS (2) having a configuration as described above increases the amount of the reforming air, if the flow amount of the raw fuel gas to be supplied to the reformer 3a is decreased, considering the increasing of the influences of the thermal mass and thermal loss of the reformer 3a upon the temperature of the reforming catalyst. On the other hand, if the flow amount of the raw fuel gas to be supplied to the reformer 3a is increased, the fuel cell system FCS (2) decreases the amount of the reforming air, considering that the thermal mass possessed by the raw fuel gas has a predominant influence upon the temperature of the reforming catalyst. In other words, considering that little influences of the thermal mass and thermal loss of the reformer 3a upon the temperature of the reforming catalyst, the fuel cell system FCS (2) decreases the amount of the reforming air.

Consequently, also taking into account of the change in the flow amount of the fuel gas, the temperature of the reforming catalyst can be kept at constant, making it possible to stabilize the composition of the fuel gas.

While the present invention has been described by referring to the embodiments (the first and second embodiments) it should be noted that various modifications and variants of the present invention can be made without departing from the sprits and the scope of the present invention.

For example, the raw fuel is not restricted to methanol, and hydrocarbon based raw fuel such as liquefied petroleum gas and gasoline may also be applied. In addition to the automatic thermal reaction, the present invention is applicable to the reforming through a partial oxidation reaction. Also, while it has been mentioned to keep the temperature of the reforming catalyst at constant in the specification, the present invention is applicable to the situation where the temperature of the reforming catalyst is set at voluntary temperature. Furthermore, while the map for the amount of the reforming air based on the injection amount of the raw fuel has been described, the map may be based on the output from the fuel cell (demand output and the real output), the flow amount of the raw fuel gas (flow amount of the fuel gas) which is a parameter having a close relation to the output from the fuel cell similar to the injection amount of the raw fuel, or such. Still further, the whole amount of the reforming air is supplied to the evaporator in the embodiments described above, but the whole amount of the reforming air may be supplied between the evaporator and the reformer. This can give better response. Also, the reforming air may be supplied to the evaporator and between the evaporator and the reformer. This can obtain the uniformity of the raw fuel gas harmonized with good response at the time of supplying the reforming air.

What is claimed is:

1. A fuel cell system comprising:
    a fuel cell in which a first reactant gas and second reactant gas are supplied to generate electricity,
    an evaporator for evaporating a raw fuel, which combustor exhaust gas discharged from said fuel cell and makes use of said exhaust gas to evaporate and volatile a raw material as a raw fuel vapor for the first reactant gas,
    a reformer which reforms the evaporated and volatilized raw fuel vapor by means of a reforming catalyst to produce the first reactant gas, and
    an air-introducing device, which introduces air used to be reformed into said evaporator or said reformer, and which possesses a device for setting a flow rate of the air and a device for correcting the flow rate of the air so that the flow rate of the air is controlled, during a stationary state after the fuel cell has completed warming up, depending upon an output from the fuel cell and upon a temperature of the raw fuel vapor.

2. The fuel cell system as claimed in claim 1, wherein said device for correcting the flow rate of the air carries out a correction based on a deviation between a measured temperature of the raw fuel and a set temperature of the raw fuel to control a flow amount of the air used to be reformed.

3. The fuel cell system as claimed in claim 2, wherein said device for correcting the flow rate of the air carries out the correction based on the output from the fuel cell to control the flow amount of the air used to be reformed, in addition to the correction based on the deviation.

4. The fuel cell system as claimed in claim 1, wherein said air-introducing device sets and restricts an upper limit of the flow amount of the air used to be reformed based on the output from the fuel cell.

5. The fuel cell system as claimed in claim 2, wherein said air-introducing device sets and restricts an upper limit of the flow amount of the air used to be reformed based on the output from the fuel cell.

6. The fuel cell system as claimed in claim 3, wherein said air-introducing device sets and restricts an upper limit of the flow amount of the air used to be reformed based on the output from the fuel cell.

7. The fuel cell system as claimed in claim 1, which further comprises a CO remover which removes carbon monoxide utilizing the air from the first reactant gas having been reformed in the reformer, and wherein the air-introducing device further introduces the air used for the removal of carbon monoxide into said CO remover in such a manner that the flow amount thereof is controlled based on the output from the fuel cell.

8. The fuel cell system as claimed in claim 1, wherein said device for correcting the flow rate of the air determines an injection amount of the raw fuel based on the output from the fuel cell and sets the flow rate of the air based on said injection amount of the raw fuel.

9. The fuel cell system as claimed in claim 1, wherein said air-introducing device controls the flow rate of the air to be introduced into said evaporator.

10. The fuel cell system as claimed in claim 3, wherein said device for correcting the flow rate of the air carries out the correction based on a map showing a relationship between an output from the fuel cell, and thermal mass or thermal loss.

* * * * *